Feb. 7, 1961

H. LAMPERT 2,970,801

GATE VALVE

Original Filed Sept. 4, 1956

INVENTOR.
Harold H Lampert
BY

United States Patent Office 2,970,801
Patented Feb. 7, 1961

2,970,801
GATE VALVE

Harold Lampert, Fremont, Nebr., assignor to Duane O. Francis, Fremont, Nebr.

Continuation of application Ser. No. 607,895, Sept. 4, 1956. This application May 20, 1959, Ser. No. 814,645

2 Claims. (Cl. 251—145)

This invention relates to gate valves for irrigation pipes and more particularly it is an object of this invention to provide a gate valve of an inexpensive construction which is particularly efficient in operation.

A particular object is to provide a gate valve having a closure member disposed on the inner side of an opening in a pipe for using the pressure of the water inside of the pipe to maintain the inner closure member in a position for efficient sealing of the valve opening.

Still another object of the invetion is to provide a gate valve as described in which the inner closure member is held in place by an outer mounting member attached to it and slidably disposed on the outer side of a wall of the pipe surrounding the outlet opening.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

This application is a continuation of the applicant's copending patent application Serial No. 607,895, filed September 4, 1956, now abandoned.

Figure 1:
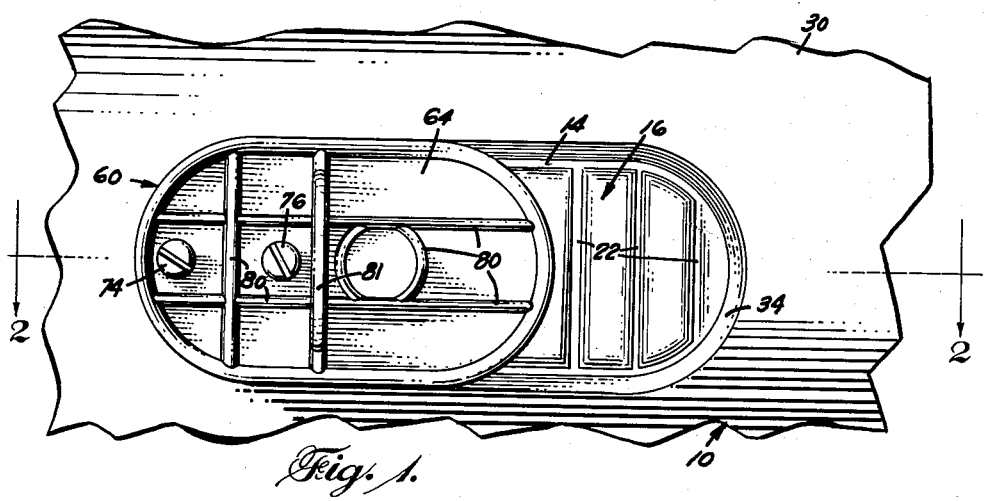
Figure 1 is a frontal elevation of the valve of this invention shown as attached to a wall portion of an irrigation pipe.

The irrigation valve of this invention is also adapted for other uses than irrigation, although its primary use is in connection with an irrigation pipe, one such pipe being partially shown at 10 in Figure 1.

The pipe 10 is ordinarily formed of aluminum although other materials can be used.

The pipe 10 is altered in accordance with this invention by providing the pipe 10 with an opening 12 through a side thereof, the opening 12 extending through a substantially flat central section 14 of an inset portion 16 of the pipe 10, the inset portion 16 surrounding the opening 12 and the flat central section 14 lying substantially in a flat plane.

The substantially flat central section 14 is provided with a plurality of spaced apart elongated grooves 22 in the outer side thereof and disposed at varying distances from the adjacent end of the opening 12.

The grooves 22 are formed by an indenting of the flat central section 14 as provides inwardly indented portions 24 on the back side of the flat central section 14 of the inset portion 16.

Figure 2:
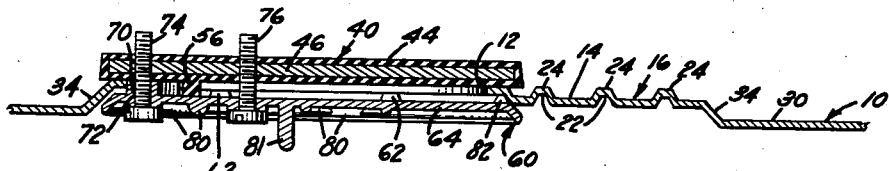
Figure 2 is a view-in-section taken along the line 2—2 of Figure 1.
Figure 4:
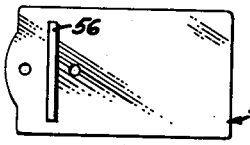
Figure 4 is an elevation and detail of the inner closure member of the valve assembly as seen from the back side thereof.
Figure 5:
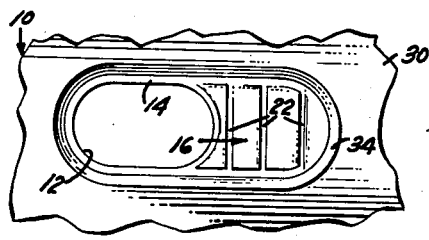
Figure 5 is a frontal elevation of the pipe portion of Figure 1 as shown with other parts of the valve removed.
Figure 3:
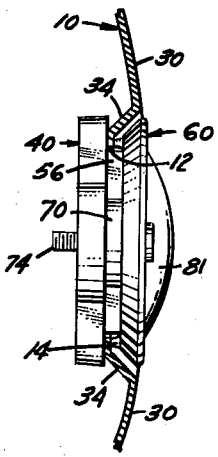
Figure 3 is a side elevation of the valve as seen from the left end as shown in Figure 1, with adjacent portions of the pipe broken away and shown in sections.
Figure 6:
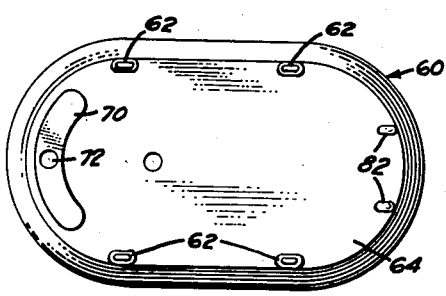
Figure 6 is a rear view of the outer mounting member of the valve assembly.

The flat central section 14 is connected to a cylindrical outer wall 30 of the pipe by means of an outwardly inclining connecting portion 34, as best seen in Fig. 2.

The grooves 22 are elongated and parallel and preferably extend from an upper to a lower end of the flat central section 14.

The movable parts of the invention comprise an inner closure member 40 which latter is disposed across the inner side of the flat central section 14, the inner closure member 40 having an area and shape sufficient for closing the opening 12. It is preferable that the opening 12 be elongated in the direction the pipe 10 is elongated and be substantially oval in shape. The inner closure member 40 can also be referred to as a gasket member 40 and it is preferably comprised of a resilient cover which is preferably of a suitable kind of rubber, the cover being indicated at 44 and surrounding a flat metal base 46.

The base 46 need not necessarily be of metal although it is important that the base 46 be flexible and resilient and that its covering 44 lend itself to the possibility of the entire gasket or inner closure member 40 being flexible and resilient, and for a purpose later described.

On the outer side of the inner closure member 40 a suitable rib or spacer bar 46 is provided which preferably extends vertically and is elongated, the spacer bar or rib 56 is preferably molded integrally with the inner closure member cover 44.

The outer side of the inner closure member 40 lies preferably substantially in a flat plane.

The inner closure member 40 is held in place for sliding movements into and away from positions for closing the opening 12 by means of an outer mounting member generally indicated at 60.

The outer mounting member 60 is disposed adjacent to the outer side of the pipe 10 and is adjacent specifically to the outer side of the flat central section 14. The outer mounting member 60 overlaps the opening 12 on all sides when the valve is in a closing position.

The outer mounting member 60 is provided with a plurality of inwardly extending lugs 62 arranged in a configuration similar to the perimeter of the outer mounting member 60, the latter being larger but of substantially the same shape as the shape of the substantially oval opening 12.

The lugs 62 are spaced apart with respect to each other and have innermost terminal ends which lie in a plane whereby the lugs 62 are adapted to rest against and slide across the outer side of the flat central portion 14. The lugs 62 serve to reduce the frictional resistance to such sliding from the amount of friction that would be present if the outer mounting member 60 was entirely in engagement with the flat central portion 14 along the center section 64 of the outer mounting member 60 which latter lies in a plane with the lugs 62 on the inner side thereof.

The outer mounting member 60 has outer edges which turn outwardly at an inclination, conforming in shape to the connecting portions 34 of the pipe 10.

The outer closure member 60 is provided with an inwardly extending protrusion 70 which latter spaces the outer mounting member 60 apart from the inner closure member 40, engaging the outer side of the latter; the outer mounting 60 is provided with a threaded opening 72 extending through the member 60 and also through the protrusion 70 transversely of the mounting member 60 for receiving a screw 74 which latter extends threadedly through the inner closure member 40.

The protrusion 70 is disposed adjacent a left hand end of the outer mounting member 60 and the spacing bar 56 is disposed inwardly of the opening 12 from the protruding portion 70.

A second screw 76 is disposed spaced apart inwardly of the opening 12 from the spacing bar 56 and the screw 74 extends threadedly through the outer mounting member 60 and also through the inner closure member 40 whereby the screw 74 holds the outer mounting member 60 and the inner closure member 40 together.

The outer closure member 60 is provided with a plurality of ribs 80 thereon as serves the purpose of providing the outer mounting member 60 with considerable strength for the amount of material in it. A suitable handle 81 extends outwardly from the outer mounting member 60 to be gripped by the finger for sliding the latter into open and closed positions.

It will be seen that in operation the valve is moved out of the closed position shown in Fig. 2 because of the springiness and the resiliency of the closure member 40 which permits the right hand ends of the closure member 40 and the outer member 60 to spread apart for allowing the lugs 82 to ride up over the sides of the grooves 22 while the resiliency of the closure member 40 causes the lugs 82 to sink back into any groove 22 they are disposed opposite for holding the valve in a desired position.

As thus described it will be seen that this invention fulfills the objects here and above set forth.

From the foregoing description, it is thought to be obvious that a gate valve constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination: a pipe for carrying water under pressure, said pipe having an inset portion having a substantially flat central section, said central section having an opening therethrough, said substantially flat central section having a plurality of spaced apart grooves therein disposed at varying distances from said opening, and said substantially flat portion having an inwardly offset contact portion surrounding said opening, an inner closure member disposed across the inner side of said pipe at said opening and adapted to close said opening by engagement with said contact portion, an outer mounting member disposed adjacent to the outer side of said pipe and overlapping said opening on two opposite sides thereof, said outer mounting member being slidably engaged against the outer side of said flat central section of said pipe, said outer mounting member having a nib thereon and projecting inwardly from that side of said mounting member which is adjacent said grooves for engaging in a desired one of said grooves to hold said mounting member in place, and means interconnecting said inner closure member and said outer mounting member and holding said members at a spacing permitting reception therebetween of said flat central section.

2. The combination of claim 1 in which said inner closure member being formed of a resilient slightly flexible construction and in which said inner closure member and said outer mounting member are interconnected by said interconnecting means only adjacent those sides thereof which are adjacent to the side of said opening which is opposite to said grooves for permitting bending of the free end of said closure member.

References Cited in the file of this patent
UNITED STATES PATENTS

| | | |
|---|---|---|
| 2,074,607 | Frey | Mar. 23, 1937 |
| 2,129,758 | Frey | Sept. 13, 1938 |
| 2,647,539 | Stearns | Aug. 4, 1953 |
| 2,734,713 | Webster | Feb. 14, 1956 |